UNITED STATES PATENT OFFICE.

FREDERICK H. PATCH, OF MANCHESTER, VIRGINIA.

ADHESIVE AND PROCESS OF MAKING SAME.

1,113,681.      Specification of Letters Patent.      Patented Oct. 13, 1914.

No Drawing.      Application filed August 10, 1906. Serial No. 330,068.

*To all whom it may concern:*

Be it known that I, FREDERICK H. PATCH, a citizen of the United States, residing at Manchester, in the county of Chesterfield and State of Virginia, have invented certain new and useful Improvements in Adhesives and Processes of Making Same, of which the following is a specification.

My present invention consists in certain improvements in, or modifications of the invention described and claimed in my former Patent No. 809,739 of Jan. 9, 1906, whereby the waste-liquor from pulp mills may be utilized by making the same into an adhesive compound of commercial value. In the present case as in the former, I combine with said liquor before or after evaporation to proper density, certain oils or fats which will prevent a product made from the compound from absorbing moisture and crumbling, and, in the case of a core for casting, will facilitate its cleaning out of the casting, and I also add flour to increase the adhesiveness of the compound. When intended for use with sands containing none or but a small percentage of loam I also add clay to enable it to pack, and when intended for use with sands which pack too closely I find an addition of saw dust of great value in opening up or making the cores or product porous.

In the present process of preparing or manufacturing the compound I use the waste or spent liquor from the paper or pulp-mills or any waste liquor or prepared solution containing resinous matters, sulfurous acid, and bases such as potash, soda, magnesia, or lime. I also use the waste or spent liquor from soda pulp-mills and any waste or spent liquor containing resinous, dextrin and starch matters.

My invention when carried out to its fullest extent is a process or method of treatment which consists in, first, making the spent liquor alkaline by means of a base, then concentrating it to a suitable density, then adding flour, clay, saw-dust and saponified animal, vegetable or mineral oils or fats, or in preparing the concentrated liquor in such a way that the animal, vegetable, or mineral oils or fat when added is saponified in the composition thus forming an adhesive liquid compound of commercial value, or by the evaporation of this compound to full dryness and pulverizing the residue, a dry compound.

Having thus stated what the nature and main feature of my invention is, I will now describe how it can be carried out.

In carrying out the invention I concentrate the waste or spent sulfite or soda liquor, etc., by evaporation to a thickness or density, for example, a specific gravity of 1.3–1.4 sufficient to keep a soapy or saponified substance in suspension. In making the improved adhesive compound from these above mentioned spent liquors or by-products I follow two different methods; to add saponified substances to the concentrated liquors or to prepare the concentrated liquors in such a way that the animal, vegetable, or mineral oils or fats when added to the preparation are saponified therein.

To procure the soapy or saponified substance I take animal, vegetable, or mineral oils or fats and combine therewith a sufficient quantity of hydrates or carbonates of potassium and sodium, any compound or composition containing potassium or sodium in excess and also resin. Any soapy or saponified substance, thus procured, is then mixed with the concentrated liquor in proper quantity as desirable.

If desired to make a compound containing flour-clay or flour and clay, both these materials are mixed with the concentrated liquor before the soapy substance is added. Saw-dust when used may be added to the mixture before or after the addition of the soapy substance as most convenient. The flour may be mixed to the concentrated liquor direct or dissolved or mixed in water and if both flour and clay are used these are mixed together dry or with water before mixed with the concentrated liquor. Flour, clay, and saw-dust are added in a quantity as required for different purposes and according to circumstances.

To prepare the concentrated spent sulfite liquor and the by-product such as may contain saccharine substance so as to saponify oils and fats when added, I add to said liquors hydrates or carbonates of potassium and sodium or any compound or composition containing potassium or sodium hydrate or carbonate in excess for example the concentrated spent liquor from soda pulp-mills in a quantity sufficient for the saponification of the animal, vegetable or mineral oil or fat that is then added to the composition. Flour-clay or flour and clay and also saw-dust, if used, are mixed with the concentrated liquor before the alkaline matter is added in the same way as above described. The process of manufacturing may be carried on with or without the aid of artificial heat as convenient or desirable and the liquor may be further concentrated after the addition of the soapy substance, or the oil, or fats, if necessary. In manufacturing the dry compound or compounds I take either of the above said concentrated spent liquors or by-product or any compound made from them as above described, evaporate it to absolute dryness and then pulverize the residue.

The adhesive liquid and dry compounds are intended chiefly for use as binders for sand in the foundry practice in making up cores and molds and in the manufacturing of briquets from coal, charcoal, saw-dust, all kinds of ores, etc., and the above described variations in the compositions are principally for the purpose of adapting them for use with different kinds or characters of sand, etc. As it is well known some sands contain in themselves clay substance (loam) while others are practically free from all clay substance. In one instance, the clay in the sand itself will obviate the necessity of adding clay to the composition to secure the binding qualities desired while in the other instance the addition of clay is desirable. By the term "loam" I mean the natural substance commonly known by that name.

The leading feature of the present invention consists in adding to the evaporated liquor, which is of a sticky or adhesive nature, whether from the soda or sulfite mills, the oils or fats prepared so that they will mix therewith and combining therewith the flour and other ingredients necessary to make the composition into a paste-like form, or evaporate to dry form, whereby it will be adapted for the use intended.

Having thus fully described my said invention, what I claim as new and desire to secure by Letters Patent, is:—

1. An adhesive compound composed of waste liquor of a sticky or adhesive character combined with a soapy compound and a binding material of the consistency of flour.

2. An adhesive compound composed of a liquor of a sticky or adhesive nature, saponified oils, and flour, substantially as herein set forth.

3. An adhesive consisting of waste sulfite liquor, soapy compound, and flour, combined, substantially as set forth.

4. The process of treating waste liquors of a sticky or adhesive character, which consist in mixing therewith a quantity of flour, evaporating to a suitable consistency to hold in suspense a soapy composition, mixing therewith said soapy composition, and evaporating to the consistency desired substantially as set forth.

5. The process of treating waste liquor of a sticky or adhesive character with flour, and evaporating to dryness and mixing with clay and saw-dust.

6. An adhesive compound composed of waste liquor of a sticky or adhesive character combined with a soapy or saponified compound with binding material added.

7. An adhesive compound composed of concentrated waste liquors containing resinous matters dextrin and starch all of a sticky or adhesive character combined with a soapy compound, substantially as set forth.

8. An adhesive compound containing waste sticky liquors, resinous matters, etc., combined with a binding material of the consistency of flour and a soapy composition, substantially as set forth.

9. An adhesive compound for use as a bond in molding consisting of sulfite liquor, saponified substance, and flour, prepared and combined substantially as set forth.

In witness whereof, I, have hereunto set my hand and seal at Washington, D. C. this second day of August, A. D. nineteen hundred and six.

FREDERICK H. PATCH. [L. S.]

Witnesses:
 E. W. BRADFORD,
 NELLIE FRIEL.